Dec. 30, 1969  D. R. PENDER  3,486,477
AMPHIBIAN VEHICLE
Filed Feb. 12, 1968  4 Sheets-Sheet 1

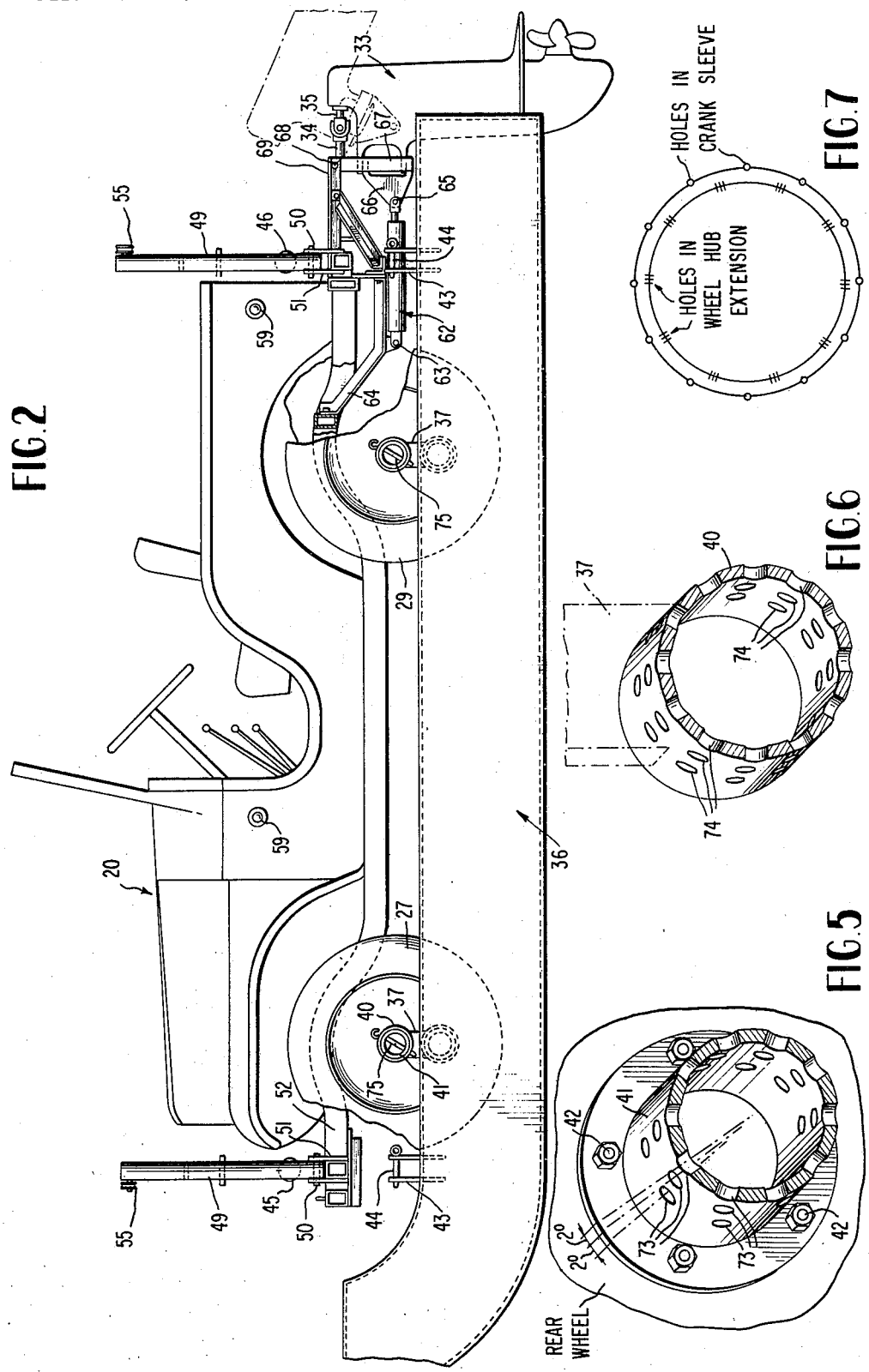

Dec. 30, 1969  D. R. PENDER  3,486,477
AMPHIBIAN VEHICLE
Filed Feb. 12, 1968  4 Sheets-Sheet 3
FIG. 3a 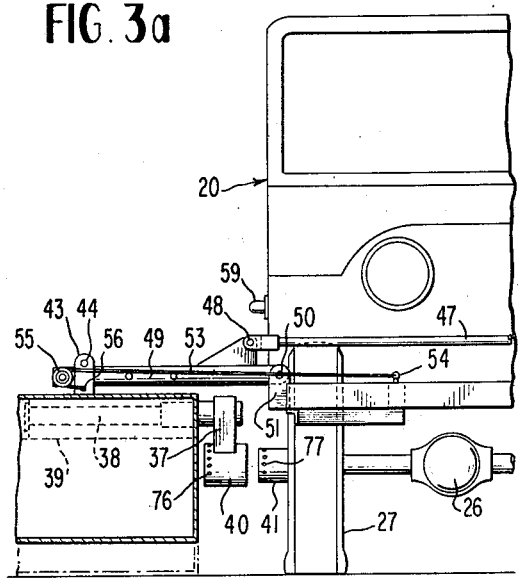 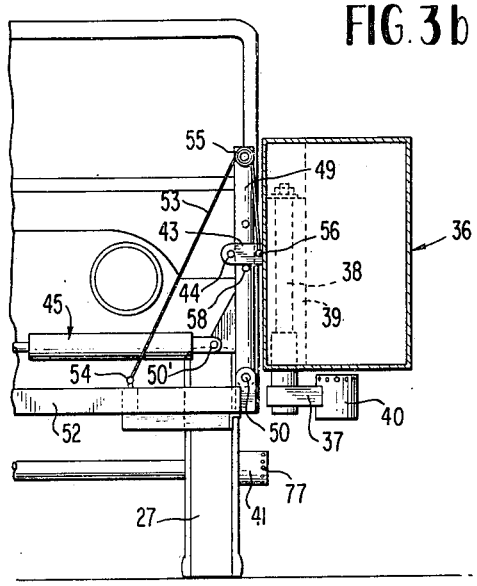 FIG. 3b
FIG. 4a 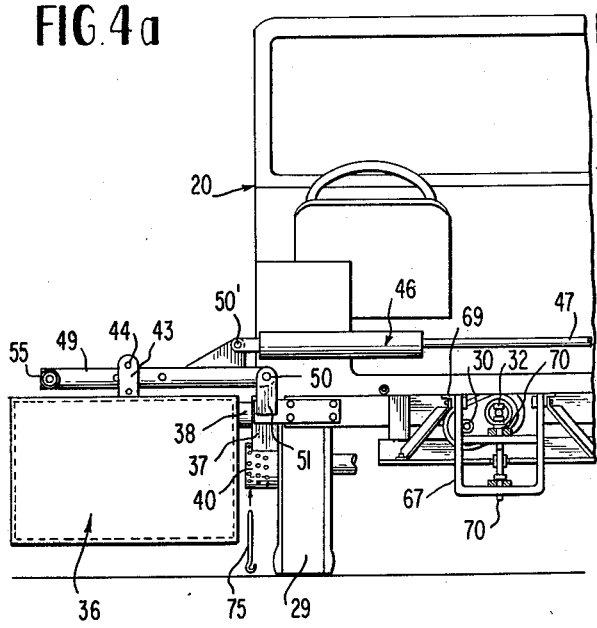 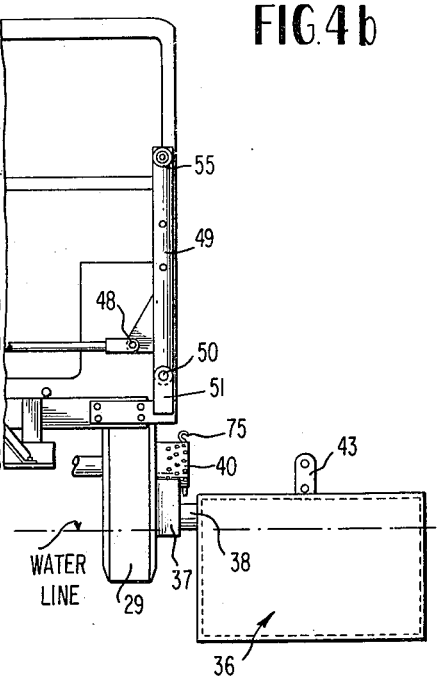 FIG. 4b Dec. 30, 1969     D. R. PENDER     3,486,477
AMPHIBIAN VEHICLE
Filed Feb. 12, 1968     4 Sheets-Sheet 4
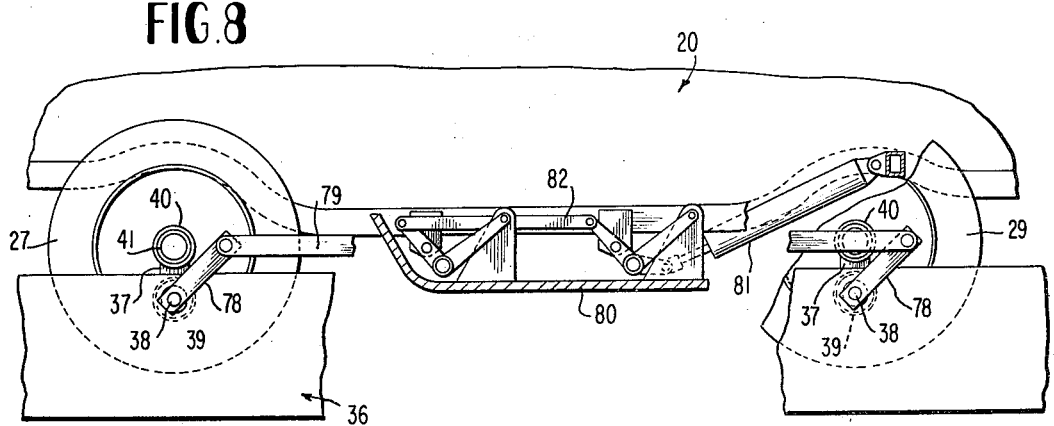
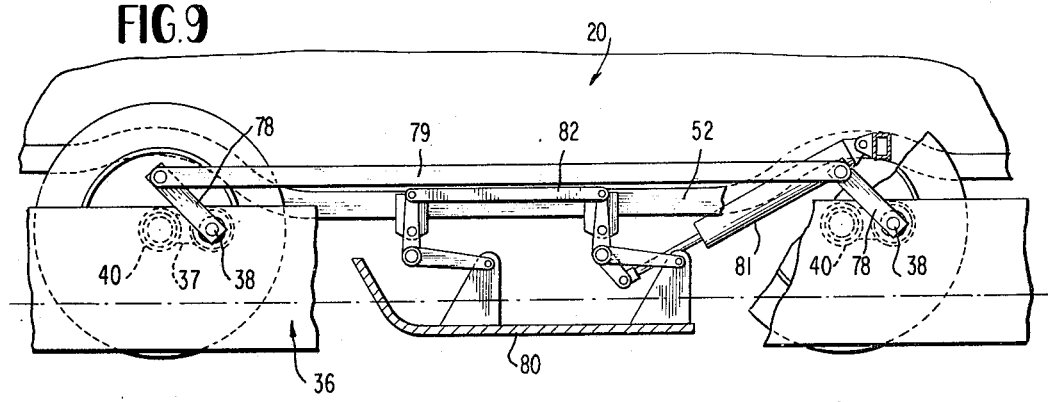
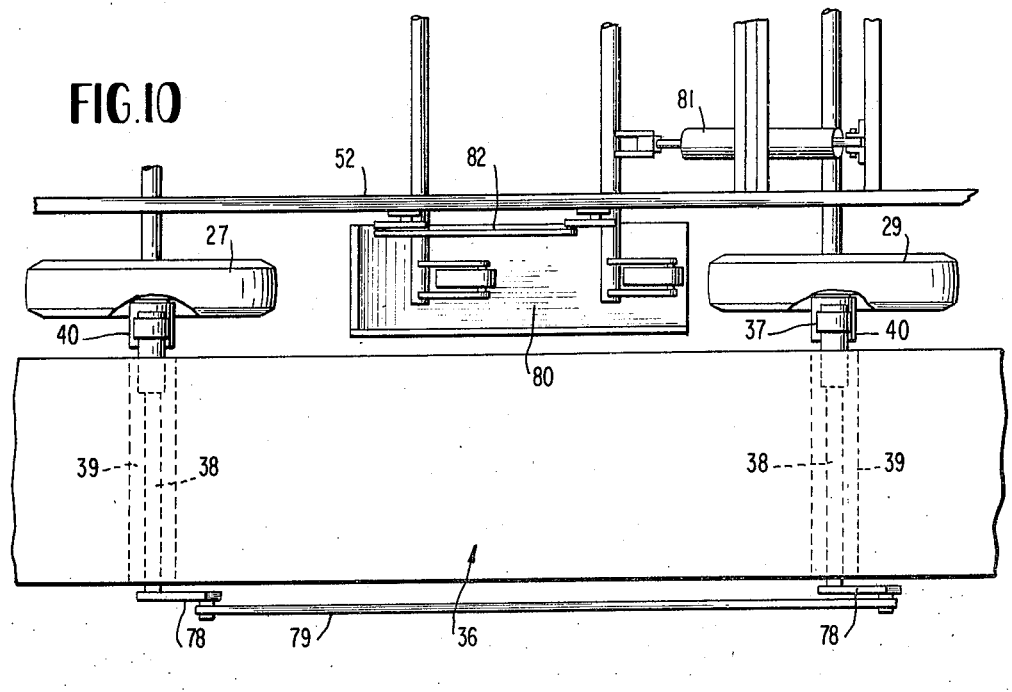

United States Patent Office 3,486,477
Patented Dec. 30, 1969

3,486,477
AMPHIBIAN VEHICLE
David R. Pender, 1018 Marion St.,
Columbia, S.C. 29201
Filed Feb. 12, 1968, Ser. No. 704,812
Int. Cl. B60f *3/00;* B62d *57/02*
U.S. Cl. 115—1
17 Claims

ABSTRACT OF THE DISCLOSURE

A vehicle which may travel on land or in the water and also in the semi-solid medium where the land meets the water. The vehicle employs wheels for conventional land travel and pontoons for water travel in conjunction with a suitable marine propulsion unit. In the intermediate semi-solid "beach" region, the vehicle is propelled by a method which embodies the combination of wheel traction and traction achieved through contact of the pontoons with the semi-solid medium in a mode which resembles hopping or leapfrogging.

BACKGROUND OF THE INVENTION

The prior art contains a number of teachings relating to amphibian vehicles including more-or-less conventional land vehicles equipped with pontoon means and marine propulsion means for water travel. Patent 3,153,396 to Pender is one example of the prior art. The vehicle disclosed in this patent will operate with satisfactory efficiency on land and in the water but is not entirely satisfactory in beach areas or marshes where the terrain is a combination of land and water and therefore semi-solid. The prior art also discloses certain amphibian vehicles which float on the water and which travel over land with a stepping or walking type action. Examples of this latter type are the vehicles in Patents 3,034,591 and 3,118,419 to Bell. The difficulty with this latter type of stepping vehicles is that its operation on land is extremely limited and slow and it is impossible for the vehicle to travel at normally desirable speeds on land.

There is a definite need in the art for a releasably efficient and economical vehicle capable of both land and water travel and also movement on the soft intermediate medium which is composed of both land and water. Ideally, such a vehicle should be a generally conventional land vehicle easily convertible to water travel with relatively high speed planing capabilities. The invention satisfies the basic requirements for such a vehicle in an economical manner not heretofore proposed in the prior art and possessing a number of major advantages over the prior art as follows:

(1) The invention utilizes the axles of the land vehicle for a direct connection with the pontoons on water, and thereby eliminates entirely the weight and cost of a separate axle means to support the pontoons as was previously required and customary.

(2) The invention utilizes the regular land vehicle springs and shock absorbers in the suspension of the pontoons and thereby eliminates the weight and cost of separate resilient suspension means between the pontoons and land vehicle, as previously required.

(3) The invention utilizes the land vehicle engine and power train to operate the pontoons in a unique hopping mode when the vehicle is entering or leaving the water and thus eliminates the weight and cost of hydraulic cylinders or other auxiliary power means for moving the pontoons relative to the vehicle as customarily required.

(4) The invention provides a definitely superior method of locomotion on semi-solid terrain, such as sand or mud, and this method of locomotion involves some rolling on wheels and some hopping or leapfrogging through the action of the pontoons. The overall traction capability of this hybrid locomotion which may be termed "roll-hop" locomotion lies somewhere between the capabilites of its components, i.e., greater traction than could be achieved with a four wheel drive land vehicle, but less than with a pure leapfrog or stepping type locomotion. The traction method of the invention, in effect, utilizes the advantages of both while simultaneously minimizing the disadvantages while operating on semi-solid mediums.

(5) The invention inherently provides ready means for shifting the pontoons forwardly or rearwardly relative to the vehicle to adjust the center of gravity in accordance with various loading and operating conditions.

(6) There is no loose hanging of the land vehicle wheel and axle assemblies while in the water. Since the pontoons are directly supported on the vehicle wheels rather than separately, the wheels and their axles will not hang downwardly from their springs while in the water. This means that less downward movement of the pontoons is required to extend the pontoons below wheel level, and consequently a shorter crank arm radius may be employed for the operation of the pontoons in their hopping mode. Also, the vertical length of the outdrive unit used for water propulsion is correspondingly lessened.

(7) The means providing support for the pontoons during land travel and for moving the pontoons to and from their land travel and water travel positions has been simplified and rendered more economical, and it is also much easier to attach and detach the pontoons than in prior art device. The attachment and detachment of the outdrive unit has also been simplified.

SUMMARY OF THE INVENTION

The amphibian vehicle of the invention utilizes preferably, although not necessarily, a four wheel drive automotive vehicle. The engine and power train of this vehicle are employed to propel the amphibian on land, in the water, and on the intermediate semi-solid terrain. Conventional wheel traction moves the vehicle on land at normal road speeds and an adjustable rear outdrive marine propulsion unit is utilized in the water.

A pair of side pontoons, preferably having planing hull capabilities, are each attached two built-in crank arms directly to live axle extensions on the vehicle wheels. When the wheels turn, the pontoons move in a cycle upwardly, forwardly, downwardly and rearwardly, to advance the vehicle in semi-solid terrain. The wheeled vehicle is lifted upwardly and forwardly in leapfrog fashion and this advances the vehicle a distance of approximately twice the radius of the crank arms. As the pontoon cranks travel through the upper portion of their cycle (between 9 o'clock and 3 o'clock) the vehicle wheels are lowered into contact with the ground and the vehicle travels forwardly a distance equal to one-half wheel revolution on its wheels, and at the same time lifts the pontoons upwardly, forwardly and downwardly. This process is repeated continuously to provide what may be termed a "roll-hop" locomotion for the vehicle while in a semi-solid medium.

The invention also utilizes simplified power assisted means to raise and lower the pontoons and to facilitate their attachment to and detachment from the wheels.

BRIEF DESCRIPTION OF THE DRAWINGS

FIGURE 2 is a side elevation of the amphibian vehicle arranged for water travel;

FIGURES 3a and 3b are partial front end elevations of the amphibian vehicle showing various movements of pontoon structure;

FIGURES 4a and 4b are similar partial rear end elevations of the amphibian vehicle;

FIGURE 5 is a fragmentary perspective view, partly in section, showing a rear wheel mounted supporting sleeve for a pontoon crank arm;

FIGURE 6 is a similar view showing a coacting crank arm sleeve which fits telescopically over the wheel mounted sleeve;

FIGURE 7 is an adjustment diagram depicting the aligning of openings in the two sleeves;

FIGURE 8 is a fragmentary side elevational view of a modification of the amphibian vehicle;

FIGURE 9 is a similar view of the modification shown in another operating position; and FIGURE 10 is a fragmentary plan view of the modified structure in its position in FIGURE 8.

DESCRIPTION OF THE PREFERRED EMBODIMENTS

Figure 1:
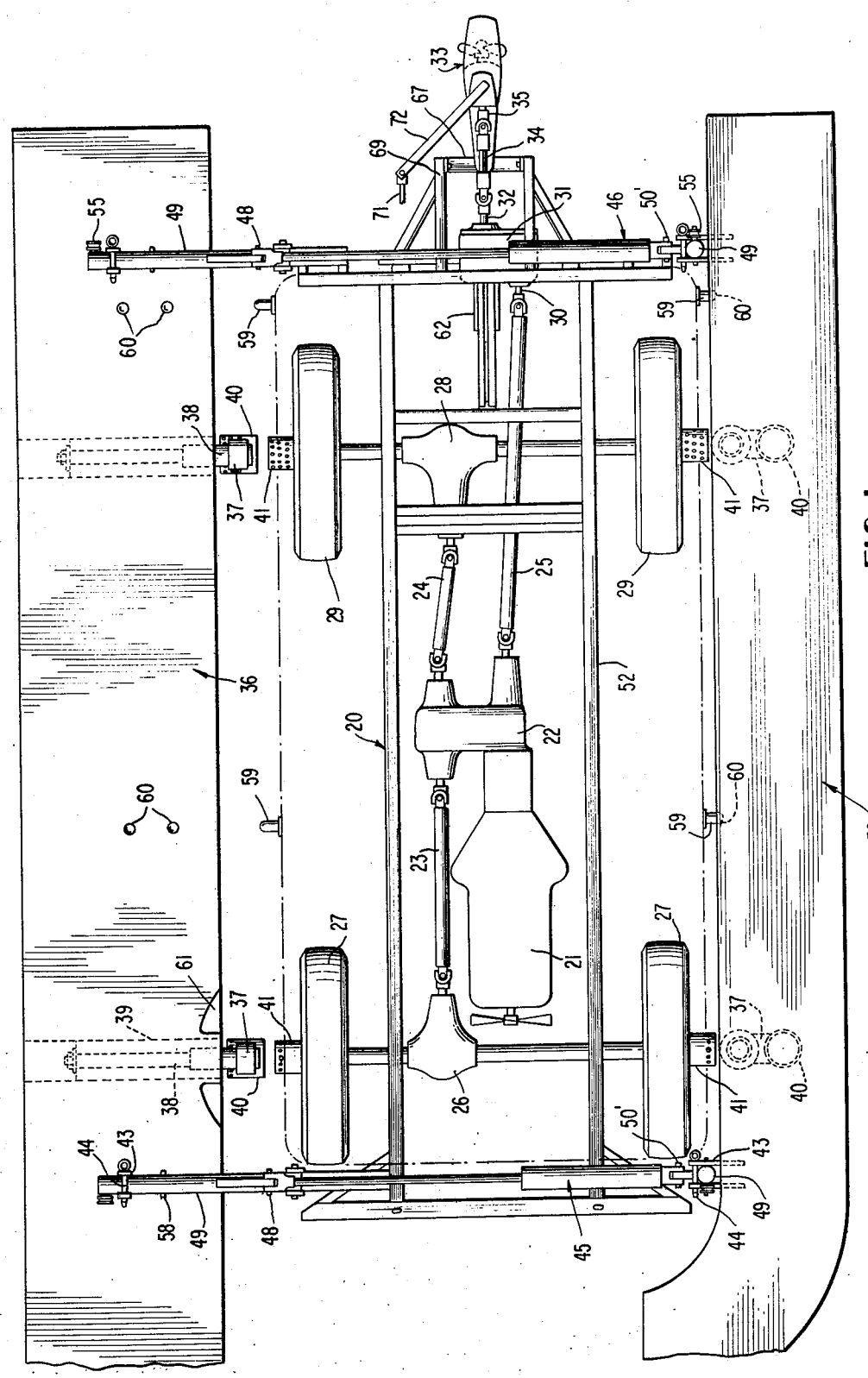
FIGURE 1 is a somewhat skeletonized plan view of an amphibian vehicle embodying the invention.

Referring to the drawings wherein like numerals designate like parts, the numeral 20 designates a generally conventional automotive land vehicle preferably of the four wheel drive type, although not necessarily so, as will be discussed hereinafter. In the embodiment illustrated in FIGURES 1 to 7 inclusive, the land vehicle 20, shown somewhat schematically in the drawings for clarity, comprises an engine 21 and speed change transmission 22 having output drive shafts 23, 24 and 25. The drive shaft 23 extends forwardly of the transmission and is connected with a front axle differential gear unit 26 through which the front wheels 27 of the land vehicle are driven. The drive shaft 24 extends rearwardly from the transmission and is connected with a second differential gear unit 28 in the rear axle assembly through which the rear traction wheels 29 are driven. The front differential unit 26 is of the permanently locked non-slip type whereas the rear differential unit 28 may be a conventional full slip differential or a limited slip type. The necessity and reason for this arrangement will be further discussed. The drive shaft 25 extends rearwardly from the transmission 22 to an input shaft 30 of a gear transmission 31 on the rear of the vehicle having an output shaft 32 which drives a marine propulsion outdrive unit 33 through another short drive shaft 34, coupled to the input shaft 35 of the outdrive unit. The above is a description of the power paths from the vehicle engine to the four wheels 27 and 29 and the marine outdrive unit 33. The vehicle is propelled on dry land, in the water, and also on soft, semi-solid terrain by power produced at the engine 21, and this includes the unique "roll-hop" method of propulsion through the pontoons which is the essence of the invention to be described.

A pair of pontoons 36 having planing hull capabilities are provided for supporting the amphibian while traveling in the water and to aid in propelling over beach regions and other terrain of a semi-solid nature. Each pontoon is provided near its fore and aft portions with crank arms 37 having shaft ends 38 which are rotatable in sturdy bushings 39 fixedly anchored to the pontoon. The end of each crank arm 37 has rigidly secured to it a cylindrical mounting sleeve 40 of a size to slide telescopically over a rotary coacting wheel mounted sleeve 41, projecting axially outwardly from the adjacent ground traction wheel of the vehicle and driven when the vehicle wheel is driven. Each wheel mounted sleeve 40 is fixedly secured to its adjacent vehicle wheel as at 42, FIGURE 5, preferably utilizing the existing wheel lugs.

Each pontoon is also equipped on its top with fore and aft bracket or clevis units 43 rigidly secured thereto and having removable clevis pins 44. These clevis units are utilized with cooperating mechanism in a unique manner to support the pontoons during land travel and to shift the pontoons into positions for ready attachment to the wheel mounted sleeves 41.

The supporting and manipulating means for the pontoons comprises forward and rear transverse horizontal hydraulic cylinder-piston units 45 and 46 which may receive activating fluid in a conventional manner from an existing system on the land vehicle 20 or from an auxiliary system if necessary. The units 45 and 46 are unattached to the main frame of the vehicle 20. As shown, the piston rods 47 of the units 45 and 46 are pivotally connected at 48 with lift arms 49, at one side of the vehicle, whose corresponding ends are pivotally connected as at 50 with brackets 51, suitably rigidly secured to the main frame structure 52 of the land vehicle. The cylinders of units 45 and 46 are pivoted at 50' to the lift arms 49 at the other side of the vehicle 20.

In order to mount the pontoons 36 for land travel, the land vehicle 20 is simply driven to a point between the two pontoons which are resting parallel with their bottoms on the ground. The vehicle is driven up until the lift arms 49 are adjacent the clevis units 43 of the pontoons. The clevis pins 44 are removed and the cylinder-piston units 45 and 46 are extended until the arms 49 swing down to horizontal positions within the clevis units. The condition is illustrated in FIGURE 3a of the drawings. The clevis pins 44 are now replaced within the clevis units 43 and are above the lift arms 49 as shown in the drawings.

Flexible cables 53 are now employed in conjunction with each lift arm 49, each cable having one end fixedly anchored at 54 to the vehicle bumper or other rigid frame structure for both the front and rear pair of cables. The cables are passed over pulleys 55 provided on each lift arm 49, and the other corresponding ends of the cables are now attached to anchor elements 56 on clevis units 43, as shown in FIGURE 3a. The pontoon lift arms 49 are now swung upwardly toward their vertical positions shown in FIGURE 3b, both front and rear lift arms, by retracting the cylinder-piston units 45 and 46. This will effectively lift the pontoons from the ground and the weight of the pontoons will now be borne by the lift arms through the clevis pins 44. As the arms 49 move toward vertical positions, the pontoons will have a tendency to slide downwardly on the inclined arms. The cables 53 will control and arrest this sliding and regulate the position of the pontoon in relation to the pair of lift arms 49, as the arms reach vertical positions as depicted in FIGURE 3b.

The cables 53 perform several important functions in the apparatus. They assure an adequate clearance between the elements 40 and 41 during the raising and lowering of the pontoons. If the pontoons were fixedly held at the extreme outer ends of the lift arms 49 and could not slide downwardly thereon during the raising operation, they would be carried too high during overland travel, FIGURE 3b, and would interfere with the driver's vision. Also, if downward movement of the pontoons on the lift arms 49 during raising and lowering was not regulated by the cables 53, interference between the parts 40 and 41 would result. The restraining action of the cables 53 can be adjusted by adjusting the location of the anchors 54 along the bumper or frame of the vehicle.

Adjustable positive stop pins 58 are employed on the lift arms 49 when the latter are raised to establish the heights of the pontoons 36. The clevis units 43 will rest on the stop pins 58, FIGURE 3b, and bear the weight during overland travel. As shown, there will preferably be at least two spaced adjustment openings in each arm 49 for stop pin 58. This will allow proper positioning of the height of the pontoons for overland travel.

To further stabilize the pontoons in their fully raised positions, detents 59 projecting beyond opposite sides of the vehicle are received in one of a pair of socket recesses 60 provided in the top of each pontoon. The spacing of the socket recesses 60 will correspond to the spacing of the openings for the stop pins 58 in the arms 49. When the pontoons are up, FIGURE 3b, the detents 59 will enter the socket recesses 60 and aid in the support of the pontoons during overland travel. If preferred, other means may be employed to raise and lower the pontoons 36 and to support them during overland travel and the means illustrated and described merely constitutes a preferred arrangement. As shown in FIGURE 1, the tops of the pontoons 36 are recessed somewhat at 61 to provide adequate clearance for turning of the front steering wheels 27 during travel overland.

The previously mentioned outdrive unit 33 is arranged for easy removal from the vehicle if it is desired to reduce overall vehicle length during overland travel. The unit 33 may then be carried in the rear compartment of the vehicle or upon some suitable bracket type carrier, not shown, similar to a spare tire carrier. If preferred, during overland travel, the outdrive unit 33 may simply be tilted to the up position shown dotted in FIGURE 2, and this movement is achieved by the operation of an expansible and retractable hydraulic cylinder-piston unit 62, pivotally attached at 63 to vehicle bracket structure 64 near the rear end of the land vehicle. The unit 62 is also pivoted at 65 to a height adjusting extension 66 of the outdrive unit. The unit 33 including extension 66 is supported on a yoke 67 pivoted at 68 to a fixed support structure 69 extending rearwardly from the land vehicle. As best shown in FIGURES 4a and 2, the outdrive unit 33 is pivoted on a vertical axis relative to the yoke 67 and relative to the extension 66 by a pair of pivot pins 70 which are easily removable when it is desired to detach the unit 33 bodily from the vehicle. When this is done, the drive shaft 34 may be easily pulled apart.

Steering in the water is accomplished by a push-pull steering cable 71, connected with a steering arm 72 on the top of the outdrive unit 33. The steering cable may be operated from the driver's compartment of the vehicle 20 by a suitable conventional control means. The cable 71 will cause the outdrive unit 33 to turn upon the vertical axis of the pins 70 to effect steering in the water. By means of appropriate conventional valving, a single hydraulic system can operate the pontoon lift cylinders 45 and 46 and the cylinder-piston unit 62 which raises and lowers the outdrive unit. Separate hydraulic systems may be employed, if desired, and the invention is subject to considerable variation as to these and other details.

To mount the pontoons 36 upon the wheels of vehicle 20, as shown in FIGURES 3a and 4a, the following is done. The lift arms 49 are lowered to horizontal positions as shown in FIGURE 3a by the use of the units 45 and 46. The cables 53 are then released or detached at the anchors 54. When this is done, the pontoons will be positioned as in FIGURE 3a and the sleeves 40 and 41 are properly aligned for telescoping engagement. The arms 49 now serve like overhead conveyor rails and the pontoons 36 may be pushed inwardly as depicted in FIGURE 4a until the mounting sleeves 40 slip over the supporting wheel mounted sleeves 41 telescopically. The clevis pins 44 serve as rollers during this movement and, if desired, may be equipped with surrounding roller bushings. When the sleeves 40 slide over the wheel mounted sleeves 41, the crank arms 37 must be in the full up or 12 o'clock positions as shown in the drawings.

Provision must be made for fastening the sleeves 40 rigidly to the driving sleeves 41 in any relative circumferential positions. That is to say, one cannot rotate the front or rear pontoon crank arms or the wheels of the land vehicle to line up holes or other fastening devices and attachment of the parts 40 and 41 must be possible in all relative positions of these parts.

To solve this problem, referring to FIGURES 5 through 7, each rear wheel mounted sleeve 41 is provided with three circumferential rows of radial openings 73, each row containing ten of the openings 73 and the openings in each row are equidistantly spaced circumferentially. Each circumferential row of openings as shown in FIGURE 5 is offset from the adjacent row by two degrees. In a like manner, the mounting sleeves 40 of the rear pair of crank arms 37 contain three circumferential rows of openings 74 with the openings equidistantly spaced in each row. Each row of openings in each sleeve 40 contains twelve openings or two more openings than the number in a row on the wheel mounted sleeves 41. Also, the rows of openings 74 are not staggered circumferentially but are aligned in the axial direction, as shown.

The geometry of the rows of openings in the rear sleeves 41 and 40 is such that when these sleeves are engaged telescopically, the ten openings 73 (five pairs) on each interior sleeve 41 are equidistantly spaced on thirty-six degree centers, and the twelve openings 74 (six pairs) on each outer sleeve 40 are equidistantly spaced on thirty degree centers. This means, referring to diagrammatic FIGURE 7, that when a pair of diametrically opposed openings 74 in the outer sleeve 40 is lined up with a pair of the openings 73 in the inner sleeve, the maximum circumferential misalignment of the adjoining pairs of openings will be six degrees (thirty-six degrees minus thirty degrees). Therefore, the openings in a single row of the outer sleeve 40 and inner sleeve can never be more than three degrees out of alignment in connection with the insertion of a diametrical locking pin 75. With the two additional circumferential rows of openings 73 in the inner sleeve 41 offset two degrees as described, there will always be a pair of openings 74 on the outer sleeve within one degree of alignment diametrically with a pair of the openings 73. Normal play or clearance between the openings and the locking pin 75 will allow the successful locking connection between the rear pairs of telescoping sleeves 40 and 41. As shown in FIGURE 3a, single rows only of locking openings 76 and 77 are required in connection with the front crank arms 37 and wheels 27. Other types of coupling means between the vehicle wheels and pontoon crank arms could be employed within the scope of the invention and only one preferred embodiment has been shown and described. Nevertheless, this embodiment is simple, very sturdy and economical. When the pontoons 36 are thus attached to the wheel mounted sleeves 41 and the locking pins 75 are in place, the pontoon lift arms 49 are raised to their vertical positions as depicted in FIGURES 2 and 4b.

Assuming that the outdrive unit 33 is mounted and tilted to its raised position, the amphibian is now ready to begin its unique "roll-hop" locomotion from dry land into the water over semi-solid terrain. The vehicle 20 will be placed in four wheel drive. At the start of the "roll-hop" locomotion, the crank arms 37 are all straight up or at 12 o'clock as a result of the mounting procedure described immediately above. Therefore, referring to FIGURE 4a, the vehicle wheels are on the ground and the vehicle will begin its forward travel on its wheels for the first ninety degrees of wheel and crank arm rotation. When the crank arms 37 reach the 3 o'clock position, the pontoons 36 will engage the ground, and as the vehicle wheels and sleeves 41 turn through another 180 degrees, the movement of the crank arms and pontoons will lift the vehicle and its wheels will leave the ground, moving upwardly, forwardly and downwardly in a "hopping" or leapfrog fashion. The pontoons 36 function like connecting rods between the front and rear crank arms 37 and the crank shafts 38 turn within the bushings 39 of the pontoons, as described. With this last-described action, the vehicle 20 will move forwardly a distance equal to twice the radii of the crank arms 37. FIGURE 2 shows the crank arms 37 in the straight down position with the vehicle 20 at the top of its "hopping" cycle. This is also shown in FIGURE 4b.

When the crank arms 37 reach a 9 o'clock position in their cycle, the wheels 27 and 29 again engage the ground and from the 9 o'clock to the 3 o'clock position of the crank arms (180 degrees), the vehicle will advance forwardly one-half revolution on its wheels under power from the engine 21. Through this same portion of the crank rotation cycle, the pontoons will travel up, over and downwardly in preparation to again lift and advance the vehicle in another hop mode. Both pontoons 36 will move in unison during the "roll-hop" locomotion while entering or leaving water. The vehicle can also travel rearwardly in the same "roll-hop" mode by placing the land vehicle 20 in reverse gear. It is necessary to aim the vehicle in the desired direction before mounting the pontoons to the sleeves 41 because the vehicle 20 will not be steerable with the pontoons attached until it is fully in the water and floating. In this latter condition, steering will be accomplished with the outdrive unit 33 utilizing the push-pull cable 71.

As the amphibian moves into water, utilizing the above-described "roll-hop" locomotion, the outdrive unit 33 will be lowered to the active position, FIGURE 2, as flotation begins. When fully afloat, the pontoon crank arms are stopped in a near full down or 6 o'clock position by utilizing the land vehicle brakes. The emergency brake is then used to hold the crank arms in the down position. With the crank arms in a near full down position, there will be very little stress on the emergency brakes while the amphibian is water-borne.

In order to leave the water and reach dry land and to disconnect the pontoon from the vehicle wheels and reposition them for overland travel, the previously described procedures are simply reversed.

As previously mentioned, the front axle dierential gear unit 26 is a non-slip permanently locked differential. It is necessary to employ this type of differential to prevent the two pontoons from getting out of phase or failing to operate in unision, as when traveling into or out of the water.

To enable the vehicle to operate on the highway, where differential gear action is required, the front wheels 26 are equipped with conventional unlocking hubs, which are hubs allowing free-wheeling of the front wheels 27 when the hubs are adjusted to their unlocking positions. When locked, there will be no differential action for the front wheels, as when entering or leaving the water, and differential action is not required at that time. Therefore, the combination of the permanently locked non-slip differential 26 and the unlocking front wheel hubs renders the vehicle flexible in that front wheel differential action is available for highway operation but is eliminated at such times when it is imperative that the two pontoons operate in phase as when traveling on semi-solid terrain. A simple adjustment of the free-wheeling or unlocking hubs to their locked condition will immediately eliminate differential turning of the front wheels. These unlocking hubs and the permanently locked non-slip differential are items known in the art and need not be shown and described in detail for a proper understanding of the invention. With the described arrangement, the inherent advantakes of a four wheel drive vehicle is always available for off-highway usage.

Another advantage of the arrangement resides in utilizing the front wheel sleeves 41 or one of them as a winch drum, with the adjacent pontoon removed, and taking advantage of the locked front differential and hub to make this possible. A rope fastened to one of the sleeves 41 may be lashed to a tree or like object and the power of the engine 21 may be utilized to wind the rope up on the sleeve 41 to assist in pulling the vehicle in extreme circumstances.

FIGURES 8 through 10 show modifications of the invention which are optional. In these figures, additional cranks 78 are arranged at the outer sides of the pontoons 36 and secured rigidly to the ends of the rotary crank axles or shafts 38. The fore and aft arms 78 are connected by outboard connecting links 79 thus forcing the several crank arms of the system to operate in unison. With the crank arms 37 and 78 permanently out of phase as shown in FIGURES 8 and 9, power is continuously and uniformly transmitted from one wheel to another in the manner that power is transmitted between pairs of drive wheels on a steam locomotive. With the two sets of cranks 37 and 78 as shown in FIGURES 8 to 10, the front and rear wheels of the vehicle 20 can never become out of phase. Additionally, the "roll-hop" locomotion of the amphibian may be achieved with a two wheel drive vehicle, if desired, rather than a four wheel drive vehicle, since power can be transmitted to the front wheels via the two sets of cranks. However, it is believed that a four wheel drive land vehicle is preferable from a general utility standpoint.

Also, in FIGURES 8 through 10, there is shown an auxiliary traction platform 80 or foot on each side of the amphibian to supplement the action of the wheels and pontoons during the "roll-hop" mode. These feet 80, when formed of buoyant material, may also aid in sustaining the amphibian in the water. Primarily, they are intended to operate in conjunction with the vehicle wheels and the pontoons 36 on semi-solid terrain.

The lift or "hop" portion of the cycle has a great deal more traction than the "roll" portion utilizing the vehicle wheels. However, there is an interdependency of the "hop" and "roll" portions of the cycle. For example, in the "roll" portion of the cycle, on extremely soft sand or mud, the wheels 27 and 29 not only lose traction but will sink to a point where the bottoms of the pontoons contact the ground when the crank arms 37 are in the full up or 12 o'clock position, causing the pontoons to also lose traction necessary for the "hop" portion of the cycle. Therefore, in such soft terrain, it is possible for the pontoons never to leave the ground, and the vehicle attempting to use the pontoons for lift and propulsion will revolve in a circular path upwardly, forwardly, downwardly and rearwardly while remaining relatively stationary. The platforms or shoes 80 are intended to be used in such extreme conditions occasionally encountered and these shoes prevent the vehicle wheels from sinking into the soft terrain, thereby allowing the "hop" portion of the locomotion cycle to operate even though the "roll" portion may have virtually no traction due to wheel slippage.

FIGURE 8 shows the auxiliary shoes 80 retracted near the tops of the pontoons, whereas FIGURE 9 shows the platforms or shoes 80 lowered to a point below pontoon level (when the pontoons are in the full up or 12 o'clock crank arm position) but slightly above firm ground level. On firm ground, the vehicle will operate in the previously-described "roll-hop" mode. When the vehicle reaches soft ground, causing the wheels to lose traction and to sink, the bottoms of the shoes 80 contact the ground and prevent further sinking. The shoes will thus hold the pontoons at a sufficient height above the ground so that forward motion can take place during the "hop" portion of the cycle, even though all wheel traction may be lost during the "roll" portion of the cycle. If the shoes 80 are lowered below firm ground level, then the vehicle will depend exclusively on "hopping" locomotion. While this is considerably slower than the preferred "roll-hop" mode, it may be employed under some circumstances. It may thus be seen that the vehicle equipped with the auxiliary shoes 80 has increased versatility of use. Also, the elements 80 may be formed of buoyant material so as to supplement the action of the pontoons 36 in the water, as previously stated.

As shown in FIGURES 8 through 10, cylinder-piston units 81 are provided in conjunction with suitable linkages 82 to accomplish the raising and lowering of the shoes 80 at desired times. This operation may be conventionally controlled from the driver's compartment of the vehicle 20.

It is to be understood that the forms of the invention herewith shown and described are to be taken as preferred examples of the same, and that various changes in the shape, size and arrangement of parts may be restorted to, without departing from the spirit of the invention or scope of the subjoined claims.

I claim:

1. An amphibian vehicle comprising a motorized land vehicle having at least one pair of driving wheels, a marine propulsion unit carried by the land vehicle and adapted when in an active position to be powered by the motor of the land vehicle, a pair of side pontoons for the amphibian vehicle adapted to support the same on water, and a pair of crank arms carried by each pontoon and having rotary connections with the pontoons, said crank arms adapted for rigid connection with the wheels of the land vehicle, whereby rotation of said wheels will cause turning of the crank arms and propulsion of the amphibian vehicle on semi-solid terrain in a rolling and hopping locomotion cycle employing both the driving wheels and said pontoons.

2. An amphibian vehicle as defined by claim 1, and sleeves mounted upon the wheels of the land vehicle and projecting axially outwardly therefrom, coacting sleeves carried by corresponding ends of the pontoon crank arms and having telescopic interlocking engagement with the wheel mounted sleeves, whereby rotation of the wheels will positively drive the crank arms in unison for cycling the pontoons and propelling the vehicle in a hopping mode.

3. An amphibian vehicle as defined by claim 1, and power means on the land vehicle having a connection with said pontoons and operable to raise the pontoons and support them in elevated positions during land travel and to lower the pontoons to supported positions where the crank arms are properly aligned with said wheels for ready attachment thereto.

4. An amphibian vehicle as defined by claim 3, wherein said power means comprises fore and aft pairs of vertically swingable pontoon lift arms on the land vehicle, retractable and extensible power units interconnecting the lift arms of each pair, and suspension devices carried by each pontoon and having a sliding connection with the adjacent lift arm of the land vehicle to facilitate shifting the pontoons into connected relationship with the wheels while the lift arms are in lowered substantially horizontal positions.

5. An amphibian vehicle as defined by claim 4, and pontoon controlling flexible elements having corresponding ends attached to the pontoons and to fixed elements on the land vehicle, and pulleys on the lift arms engaging the flexible elements.

6. An amphibian vehicle as defined by claim 1, wherein said motorized land vehicle is a four wheel drive vehicle.

7. An amphibian vehicle as defined by claim 6, wherein said four wheel drive vehicle includes a front driving axle assembly having a permanently locked non-slip differential gear unit therein, and locking hubs interconnecting the front wheels of the vehicle with the front driving axles, said hubs having unlocked positions rendering the front wheels free-wheeling with respect to their driving axles, the front wheels turning with their driving axles when said hubs are locked.

8. An amphibian vehicle as defined by claim 2, wherein the wheel sleeves and coacting sleeves of one transversely opposed pair of wheels each have plural circumferential rows of circumferentially spaced openings, there being one less pair of openings in each row of one sleeve of each coacting pair than on the other sleeve of that pair, and the circumferential rows of one sleeve of each pair being slightly offset circumferentially.

9. A vehicle capable of traveling on extremely soft semisolid terrain without bogging down comprising a self-propelling wheeled land vehicle including at least a pair of traction driving wheels, a broad surfaced vehicle supporting and propelling element on each side of the land vehicle outwardly of the wheels thereof and extending substantially between the front and rear wheels of the land vehicle, and eccentric driving means directly interconnecting the wheels of the land vehicle and said supporting and propelling elements so that driving rotation of the wheels will bring the bottoms of the supporting and propelling elements into contact with the terrain to lift and advance the land vehicle in a hopping mode and then lower the land vehicle until its rotating driving wheels engage the terrain to further advance the land vehicle in a rolling mode while said supporting and propelling elements are being elevated and subsequently lowered into contact with the terrain preparatory to repeating the locomotion cycle.

10. A vehicle according to claim 9, in which the eccentric driving means comprises a pair of crank arms on each vehicle supporting and propelling element in spaced relation, mounting parts on the crank arms, coacting mounting parts on the ground-engaging wheels of the land vehicle having interfitting relation with the mounting parts of the crank arms, and means to adjust and lock said interfitting mounting parts in selected relative positions.

11. A vehicle according to claim 9, wherein said supporting and propelling elements and eccentric driving means comprise units on opposite sides of the land vehicle readily detachable therefrom.

12. A vehicle according to claim 11, and means on the land vehicle for raising and lowering said units and carrying the units in elevated positions during overland travel.

13. A vehicle according to claim 9, and a pair of power-operated auxiliary weight-bearing shoes carried by the opposite sides of the land vehicle and adapted to be lowered to a level below the bottoms of the vehicle supporting and propelling elements when the latter are in a full up position and said shoes then being somewhat above the level of the terrain and arresting sinking of the vehicle in the soft terrain.

14. A vehicle according to claim 13, and wherein said auxiliary shoes are disposed between the forward and rear wheels of the land vehicle near the inner sides of the broad surfaced vehicle supporting and propelling elements, raising and lowering linkages on the land vehicle carrying said shoes, and power actuators on the land vehicle connected with said linkages.

15. A vehicle according to claim 10, and wherein each crank arm includes a crank shaft having a rotary connection with the adjacent supporting and propelling element, additional cranks on the crank shafts and being angularly out of phase with said crank arms, and links interconnecting said additional cranks of each forward and rear pair of crank arms on the vehicle supporting and propelling elements causing said crank arms to operate in phase and in unison.

16. A vehicle as defined by claim 10, wherein said means to adjust and lock comprises telescopically interfitting circumferentially adjustable pairs of sleeves, one each on the wheels and crank arms, the sleeves of each pair having circumferential rows of radial openings with the openings in the two sleeves so spaced in the rows and the rows so spaced that diametrical pairs of openings in the two sleeves may be aligned for any relative positions of the wheel and crank arm, and a locking pin element engaging through aligned pairs of openings of the two sleeves.

17. A vehicle comprising an automotive type wheeled land vehicle, a marine outdrive unit adjustably connected with said land vehicle, pontoons on opposite sides of the land vehicle extending longitudinally thereof between the front and rear wheels of the land vehicle, direct driving interconnecting means between the pontoons and said front and rear wheels and said means being eccentric to the wheels for delivering a step-like cycle of operation to the pontoons when the wheels turn, a single engine on the land vehicle, power trains from said engine to the front and rear wheel axles of the land vehicle and to said marine outdrive unit, and power-operated carrier means for the pontoons on said land vehicle adapted to elevate the pontoons and hold them in overland portage positions and to lower the pontoons and support them in alignment with said wheels for ready coupling thereto.

References Cited

UNITED STATES PATENTS 3,118,419  1/1964  Bell _____ 115—1
3,153,396  10/1964  Pender _____ 115—1

ANDREW H. FARRELL, Primary Examiner

U.S. Cl. X.R.

180—8